United States Patent

Izquierdo et al.

(10) Patent No.: US 9,116,676 B2
(45) Date of Patent: Aug. 25, 2015

(54) POWER DISTRIBUTION TO COMPUTER SYSTEM

(75) Inventors: Javier F. Izquierdo, Houston, TX (US); Ronald D. Noblett, Bellaire, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 637 days.

(21) Appl. No.: 13/320,947

(22) PCT Filed: Jun. 23, 2009

(86) PCT No.: PCT/US2009/048249
§ 371 (c)(1),
(2), (4) Date: Nov. 17, 2011

(87) PCT Pub. No.: WO2010/151248
PCT Pub. Date: Dec. 29, 2010

(65) Prior Publication Data
US 2012/0084579 A1 Apr. 5, 2012

(51) Int. Cl.
G06F 1/26 (2006.01)
G06F 1/32 (2006.01)
H02J 1/08 (2006.01)

(52) U.S. Cl.
CPC .............. *G06F 1/26* (2013.01); *G06F 1/3203* (2013.01); *H02J 1/08* (2013.01)

(58) Field of Classification Search
CPC ........................................................ G06F 1/26
USPC ............................................ 307/18; 713/300
See application file for complete search history.

(56) References Cited

U.S. PATENT DOCUMENTS 5,961,647 A * 10/1999 Kim et al. ...................... 713/300
6,275,946 B1 * 8/2001 Meir ............................. 713/300

(Continued)

FOREIGN PATENT DOCUMENTS

CN 1212087 A 3/1999
CN 1732613 2/2006

(Continued)

OTHER PUBLICATIONS

IPO, Examination Report dated Apr. 30, 2014, GB App. No. 1200041.0.
IPO, Further Search Report, mailed Sep. 24, 2014, Pat. App No. GB1200041.0.

*Primary Examiner* — Rexford Barnie
*Assistant Examiner* — Joseph Inge
(74) *Attorney, Agent, or Firm* — Conley Rose, PC (57) ABSTRACT

Power distribution to computer systems. At least some of the illustrative embodiments are systems including a power supply configured to convert an alternating current (AC) power signal to a direct current (DC) power signal (and the power supply comprising a first power port and a second power port, the second power port different than the first power port), a first computer system coupled to the first power port (the power supply configured to provide DC operational power to the first computer system through the first power port, and the first computer system the only computer system receiving operational power through the first power port), and a second computer system different than the first computer system (the power supply configured to provide DC operational power to the second computer system through the second power port, and the second computer system the only computer system receiving power from the second power port).

11 Claims, 5 Drawing Sheets

(56) References Cited

U.S. PATENT DOCUMENTS

| | | |
|---|---|---|
| 2003/0065961 A1 | 4/2003 | Koenen |
| 2005/0189916 A1* | 9/2005 | Bucur ............................ 320/128 |
| 2006/0012359 A1* | 1/2006 | Chiu ............................. 323/284 |
| 2006/0232386 A1 | 10/2006 | Jeon |
| 2008/0270808 A1 | 10/2008 | Blakely et al. |
| 2009/0134703 A1* | 5/2009 | Chung et al. ................... 307/64 |
| 2010/0214082 A1* | 8/2010 | Covaro et al. ............ 340/310.12 |

FOREIGN PATENT DOCUMENTS

| | | |
|---|---|---|
| CN | 1960175 | 5/2007 |
| DE | 10 2004 032 497 A1 | 1/2006 |
| EP | 1577998 | 9/2005 |
| WO | WO96/22627 | 7/1996 |

* cited by examiner

POWER DISTRIBUTION TO COMPUTER SYSTEM

BACKGROUND

In many rack-mounted computing systems (e.g., server farms, data centers, telecommunication switching equipment), in order to decrease the size of the individual computer systems (e.g., rack-mounted computer systems, or "blade servers" that couple within a rack-mounted enclosure) and to provide power redundancy, the power supplies that initially convert alternating current (AC) to direct current (DC) are separated from the computer systems within the rack. DC power is then distributed to the various computer systems by way of a low voltage (e.g., 12 Volt) shared bus bar, where each computer system couples to and draws power from the shared bus bar.

BRIEF DESCRIPTION OF THE DRAWINGS

For a detailed description of exemplary embodiments, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function.

In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct connection or through an indirect connection.

"Operational power" shall mean power to operate, in whole or in part, a computer system. Although some electronic data communications have a net power flow from the transmitting to the receiving device, such power flow appurtenant to data communications shall not be considered operational power for purposes of this disclosure and claims.

"Direct current (DC) operational power" shall mean operational power transfer between a first device and a second device by way of a DC voltage, and the fact the DC voltage may be in the form of a stream of pulses of varying duty cycle shall not negate the status of the power as DC operational power.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

The various embodiments were developed in the context of rack-mounted computer systems, such as rack-mounted servers and rack-mounted blade enclosures having a plurality of blade servers therein, and where the rack-mounted computer systems may be operated as server farm or data center. The description that follows is based on the developmental context. However, the power distribution systems and methods as described herein are not limited to rack-mounted computer systems operating as servers or a data center. The power distribution systems and methods find application in other high density computing systems, such as telecommunication router systems and data communication switching centers. Thus, the developmental context shall not be construed as a limitation as to the applicability of the various embodiments.

Figure 1:
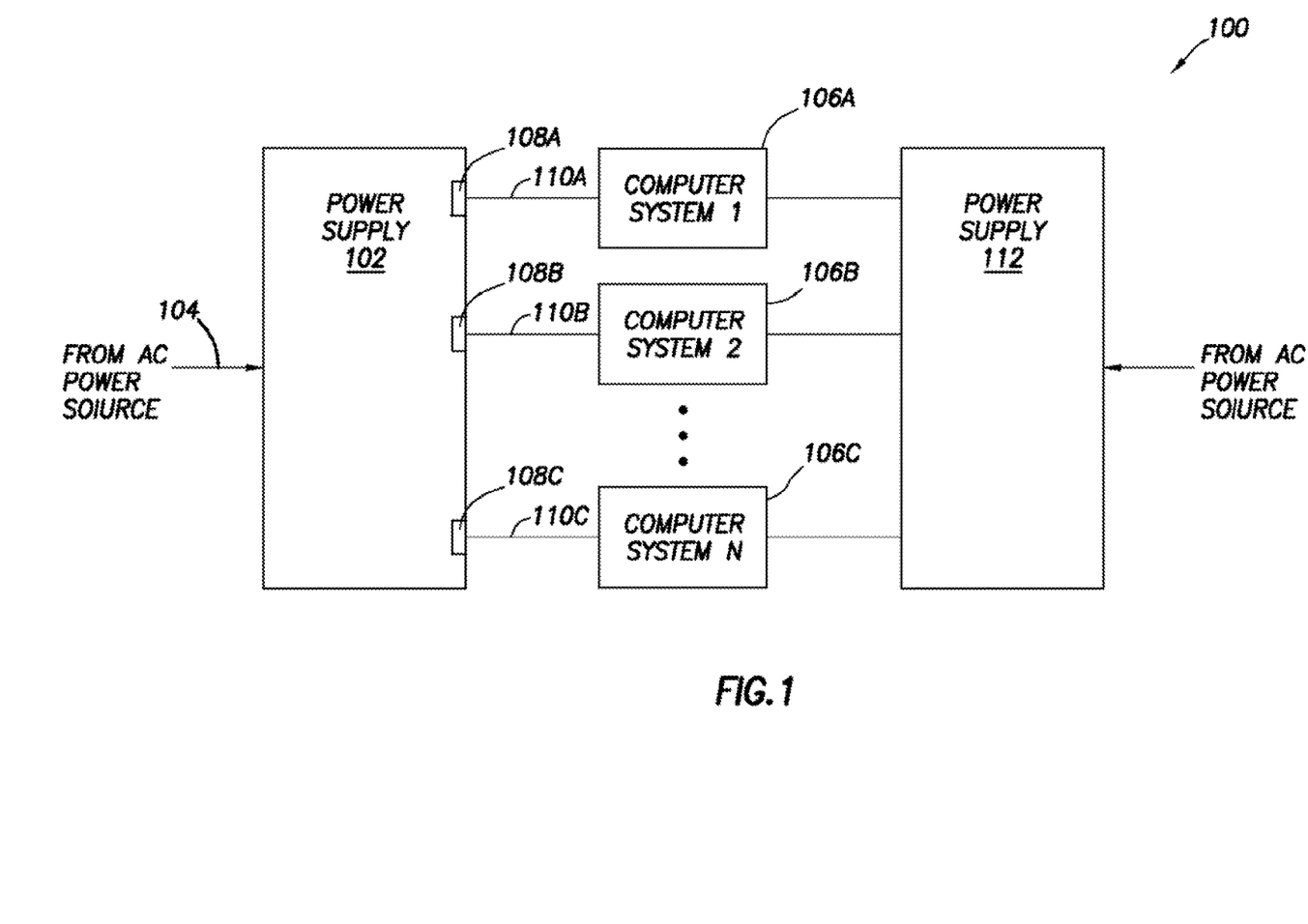
FIG. 1 shows a system in accordance with at least some embodiments.

FIG. 1 illustrates a computing system 100 in accordance with at least some embodiments. In particular, FIG. 1 illustrates a power supply 102 that couples to an alternating current (AC) power signal 104. In accordance with the various embodiments, the power supply 102 is a centralized power supply for a rack-mounted computing system, such as a group of servers, a data center, a telecommunication router system, or data communication switching center. The power supply 102 converts the AC power to a direct current (DC) power signal, and the power supply distributes DC power to the computer systems. Illustrative internal operation of power supplies in accordance with the various embodiments, such as power supply 102, is discussed more below.

The power supply 102 couples to a plurality of computer systems 106. While only three computer systems 106 are illustrated, systems with two or more computer systems 106 are within the contemplation of the various embodiments. Unlike related-art systems where the computer systems 106 draw power from a shared bus external to the power supply, in the various embodiments each computer system 106 has a separate and independent coupling to the power supply 102. In particular, the power supply 102 has a power port 108A to which computer system 106A couples by way of cable 110A, and computer system 106A is the only computer system that receives operational power from power port 108A. Likewise, power supply 102 has power port 108B to which computer system 106B couples by way of cable 110B, and computer system 106B is the only computer system that receives operational power from power port 108B. Finally, for the illustrative case of FIG. 1, power supply 102 has power port 108C to which computer system 106C couples by way of cable 110C, and computer system 106C is the only computer system that receives operational power from power port 108C. The power ports 108 may take any suitable form (e.g., sockets of a particular style to which the cord ends of cables 110 couple, terminal blocks to which the conductors of cables 110 couple directly or through lugs).

Thus, rather than shared bus bar architecture of the related art, in accordance with the various embodiments the power supply-to-computer system connections are point-to-point connections. Point-to-point connections enable functionality not present in shared bus systems. For example, the power supply 102 may monitor power consumption of each computer system 106, and take appropriate action only with respect to a computer system 106 drawing more than allotted, or greater than rated, power consumption. An illustrative communication mechanism to implement monitoring and control by the power supply 102 is discussed more below. Further, the point-to-point connections between the power supply 102 and the computer systems 106 isolate wiring and cabling faults to a single computer system 106. For example, if a ground fault, short or high resistance connection develops between power supply 102 and the computer system 106A, the illustrative ground fault, short or high resistance connection will not affect operational power flow from the power supply 102 to the remaining computer systems 106B and 106C.

FIG. 1 further illustrates that the computing system 100 may further comprise a second or redundant power supply 112. Like power supply 102, power supply 112 couples to the computer systems by way of point-to-point connections, and thus may provide operational power to the computer systems 106 individually. In accordance with embodiments where a redundant power supply 112 is used, each power supply 102, 112 may be configured to supply all the operational power to the computer systems 106 such that, in the event of failure of one power supply 102, 112, the second power supply 102, 112 rapidly increases the supplied operational power to keep the computer systems 106 operational. Operation of illustrative power supply 112 is similar to that of power supply 102, and thus the following more detailed discussion of the operation of power supply 102 is equally applicable to power supply 112.

Still referring to FIG. 1, in accordance with at least some embodiments, the operational power transferred between the power supply 102 and the computer systems 106 is in the form of high voltage DC. Thus, the power transferred or provided by power supply 102 may be referred to as DC operational power. In particular, in at least some embodiments the DC operational power provided by power supply 102 has a voltage of greater than 300 Volts (V), in some cases between 380 and 480 V, and in some particular cases 400 V. Providing DC operational power in the range of 380 to 480 V reduces the size and/or number of conductors needed to carry the electrical current for the supplied power (as compared to, for example, a 12 V distribution). While even higher voltages are contemplated for the DC operational power, above certain voltage limits high supply voltages causes underwriting agencies (e.g., Underwriters Laboratories (UL)) to require conductor separation distances, shielding, and/or dielectric material thicknesses that do not fit well with rack-mounted computing systems.

Figure 2:
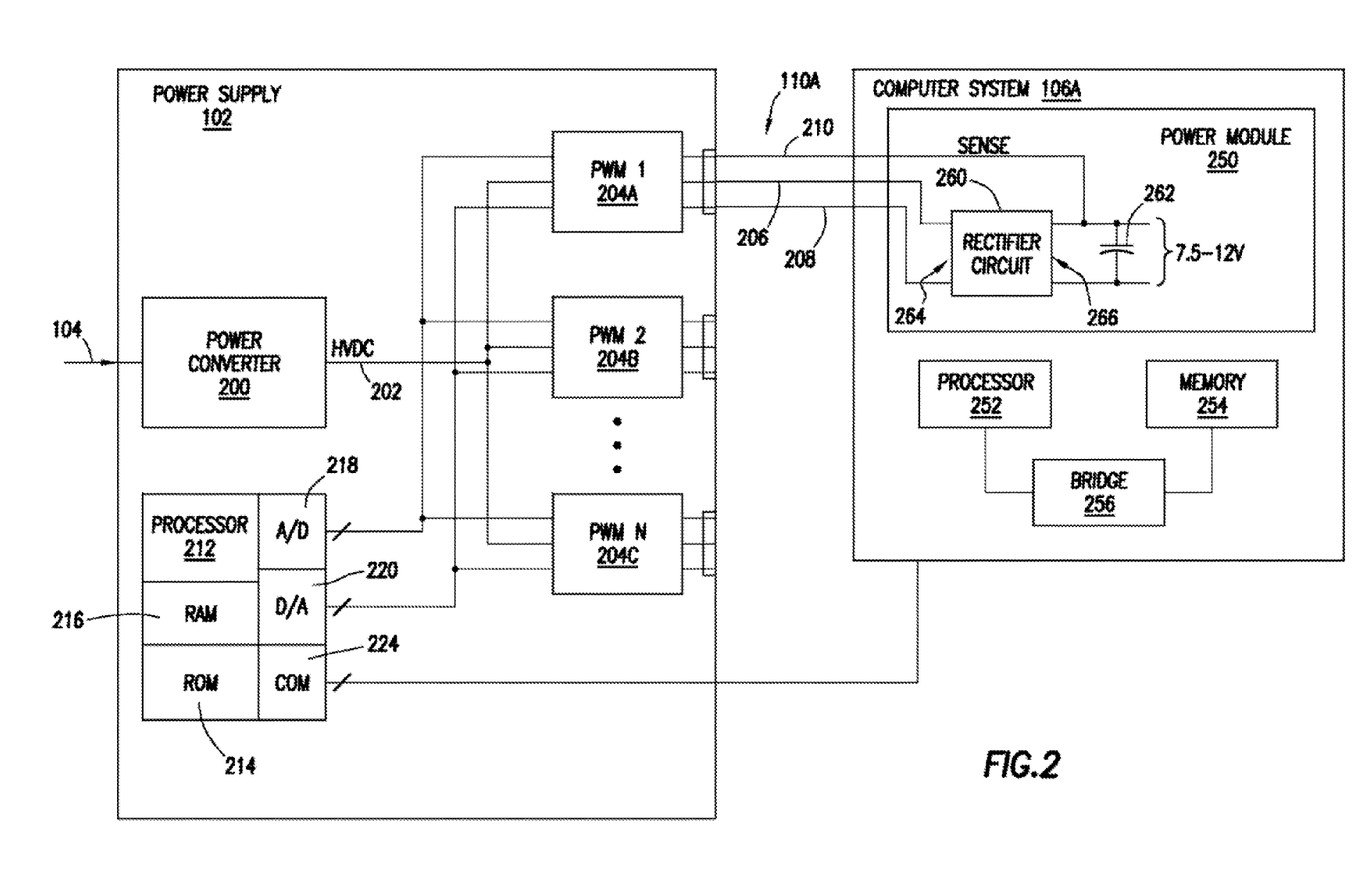
FIG. 2 shows a portion of the system of FIG. 1 in greater detail, and in accordance with at least some embodiments.

FIG. 2 shows a portion of the system of FIG. 1, and the portion shown in FIG. 2 is shown in greater detail. In particular, FIG. 2 shows, in block diagram form, illustrative internal components of power supply 102 (illustrative of both power supplies 102, 112) and computer system 106A (illustrative of all the computer systems 106). The additional computer systems 106 are not shown as not to unduly complicate the figure. Power supply 102 comprises a power converter 200. The power converter 200 receives AC power on signal line 104, and coverts the AC signal to a high voltage DC power signal (HVDC) 202. In some cases the voltage on the high voltage DC power signal 202 is greater than 300 V, in some cases between 380 and 480 V, and in some particular cases 400 V. The power converter 200 may take any suitable form, and in some embodiments may have the capability of converting 5 kilo-Watts of power at any given instant. Power supply 102 further comprises a plurality of pulse-width modulation (PWM) circuits 204. Each pulse width modulation circuit 204 couples on an input side to the high voltage DC power signal 202, and each pulse width modulation circuit is configured to couple a computer system in the point-to-point configuration discussed above. In the case of pulse width modulation circuit 204A, the circuit 204A is coupled to computer system 106A by way of cable 110A.

In accordance with at least some embodiments, the power supply 102 provides DC operational power to the computer system 106A in the form of pulse train with a duty cycle. In particular, the cable 110A comprises an active conductor 206, a return conductor 208 and a sense conductor or sense signal line 210. The pulse width modulation circuit is configured to create the pulse train on the active conductor 206 relative to the return conductor 208. Further, the illustrative pulse width modulation circuit 204A is configured to sense voltage, or a value indicative of voltage, within the computer system 106A by way of sense signal line 210, and change the duty cycle of the pulse train based on the signal. Increased power drawn by the illustrative computer system 106A will tend to decrease sensed voltage, and thus the illustrative pulse width modulation circuit 204A is configured to increase duty cycle as the computer system 106A increases power drawn. Likewise, decreased power drawn by the illustrative computer system 106A will tend to increase sensed voltage, and thus the illustrative pulse width modulation circuit 204A is configured to decrease duty cycle as the computer system 106A decreases power drawn.

Figure 3:
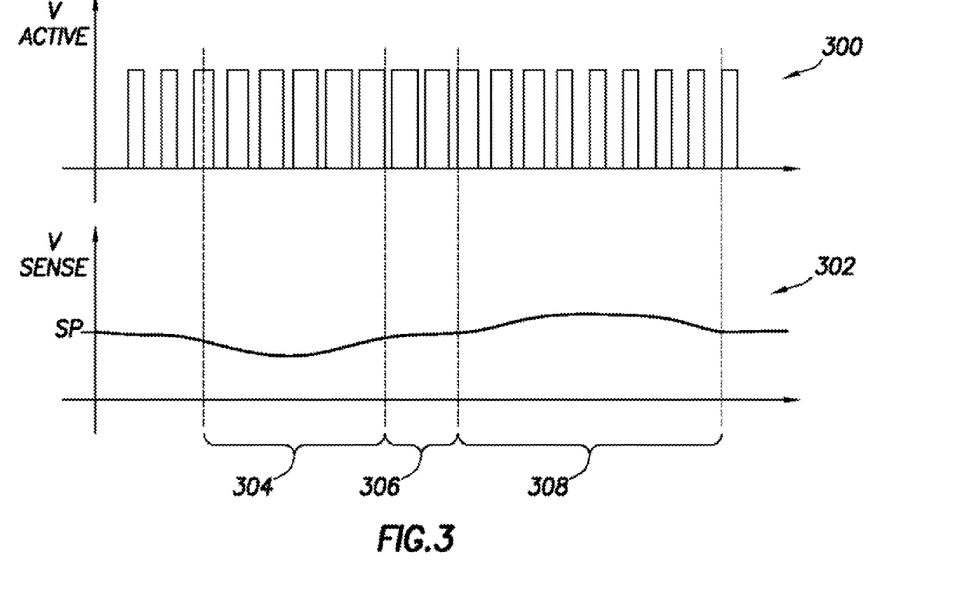
FIG. 3 shows plots of a pulse train and sense signal in accordance with at least some embodiments.

FIG. 3 shows two plots as function of corresponding time. The upper plot 300 shows an illustrative set of pulses in a pulse train transferring DC operational power (e.g., between power supply 102 and computer system 106A). The lower plot 302 shows an illustrative signal on the sense signal line 210 (FIG. 2). Referring to plot 300, in accordance with at least some embodiments the frequency of the pulse train is greater than one kilo-Hertz, and in some embodiments the frequency of the pulse train is about 100 kilo-Hertz. Since the pulse train is not in information carrying (i.e., no information extraction from the pulse train), the term "about" in reference to frequency in this case means that frequencies several hundred Hertz above and/or several hundred Hertz below a delineated frequency are operational and thus shall still be considered to fall within the recitation. While plot 300 shows changing duty cycle, plot 300 illustrates that the frequency of the pulse change is substantially constant.

Referring to plot 302, the voltage sensed from within the computer system 106A has a particular set point (SP). Duty cycle held constant, as the power drawn by the computer system increases, the voltage within the computer system will tend to decrease (i.e., over relatively small periods of time, less power transferred to the computer system 106A by the pulse train from the power supply 102 than consumed). Plot 302 illustrates a decrease in sensed voltage below the set point in region 304. It is noted that the voltage excursion in region 304 is exaggerated for purposes of clarity, and in practice the voltage changes will be slight (e.g., on the order of tenths of Volts). Responsive to the illustrative voltage drop, the pulse width modulation circuit 204A is configured to increase the duty cycle, as shown in region 304 of plot 300. Increasing duty cycle increases power transfer between the power supply 102 and the computer system 106A, thus again balancing power transfer to, and power consumption by, the computer system 106A. In region 306, power balance is achieved, and thus duty cycle remains unchanged. Again, duty cycle held constant, as the power drawn by the computer system decreases, the voltage within the computer system will tend to increase (i.e., over relatively small periods of time, more power transferred to the computer system 106A by the pulse train from the power supply 102 than consumed). Plot 302 illustrates an increase in sensed voltage above the set point in region 308. Responsive to the illustrative voltage increase, the pulse width modulation circuit 204A is configured to decrease the duty cycle, again as shown in region 308 of plot 300. Decreasing duty cycle decreases power transfer between the power supply 102 and the computer system 106A, thus again balancing power transfer to, and power consumption by, the computer system 106A.

Returning to FIG. 2, each of the pulse width modulation circuits 204 has the capability of providing DC operational power in the form of a pulse train with a duty cycle. Inasmuch as each pulse width modulation circuit has its respective sense signal line, each pulse width modulation circuit individually controls the duty cycle of the DC operational power provided to the respective computer system 106. In cases where the voltage on the high voltage DC power signal 202 is 400 V, during the active or on-time each pulse has a voltage of 400 V.

In some embodiments, the only communication between the power supply 112 and the computer system 106A is the signal indicative of voltage on the signal line 210. However, in other embodiments the power supply 102 and computer 106A may communicate by way of a digital communication system. In particular, in some embodiments the power supply 102 may comprise a processor 212. The processor 212 may be a microcontroller, and therefore the microcontroller may be integral with read only memory (ROM) 214, random access memory (RAM) 216, an analog-to-digital converter (N/D) 218, a digital-to-analog converter (D/A) 220 and communication (COM) circuit 224. Although a microcontroller may be particularly suited because of the integrated components, in alternative embodiments the processor 212 may be implemented as a standalone central processing unit in combination with individual ROM, RAM, A/D, D/A and communication devices.

The ROM 214 stores instructions executable by the processor 212. In particular, the ROM 214 comprises software programs that, when executed, make the processor 212 a special-purpose processor to manage the power supply 102, and as discussed more fully below communicate with computer systems 106 and implement functionality based on such communications. The RAM 216 is the working memory for the processor 212, where data is temporarily stored and from which instructions are executed. Processor 212 couples to the pulse width modulation circuits 204 by any suitable mechanism, and as illustrated communication to the pulse width modulation circuits 204 is by way of analog signals from the digital-to-analog converter 220, and communication from the pulse width modulation circuits 204 is by way of analog signals into the analog-to-digital converter 218. Moreover, processor 212 couples to the computer systems 106 by way of communication circuit 224.

In accordance with at least some embodiments, the processor 212, executing a program stored in ROM 214 and executed from either ROM 214 or RAM 216, communicates with the computer systems 106. In some embodiments, each computer system 106 may provide to the processor 212 an indication of the maximum expected power draw. The processor 212 then may monitor the amount of power provided to each computer system 106 (e.g., by way of an analog signal indicative of the duty cycle provided to the processor's analog-to-digital converter 218). In the event a particular computer system 106 draws more than the maximum expected power (and perhaps a guard band and/or time window (e.g., more than five seconds)), such a power draw may be indicative of a fault condition in the computer system 106. Responsive thereto, the processor 212 may reduce, or turn off, the power provided to the computer system 106. For example, the processor 212 may command a reduction in duty cycle to the respective pulse width modulation circuit 204 by way of an analog signal from the digital-to-analog converter 220.

Still referring to FIG. 2, illustrative computer system 106A comprises a power module 250, a processor 252, memory 254 and a bridge device 256. The processor 252 couples to memory 254 by way of the bridge device 256. Moreover, the processor 242 may couple to other devices (e.g., input/output devices, a hard drive, network interface) by way of the bridge device 256. The various additional devices are not needed for an understanding of the various embodiments, and are thus omitted so as not to unduly complicate the figure.

The power module 250 receives DC operational power from the power supply 102, and provides power to the computer system 106 devices, such as the processor 252, memory 254 and bridge device 256. The power module 250 comprises a rectifier circuit 260 and a filter circuit 262 illustrated as a capacitor. The rectifier circuit 260 defines an input portion 264 and an output portion 266. The DC operational power, in some embodiments in the form of a pulse train having a varying duty cycle, from the power supply 102 couples to the input portion 264, and as illustrated the filter circuit 262 couples to the output portion 266. Likewise, in some embodiments the sense signal line 210 couples to the output portion 266 of the rectifier circuit 260. In accordance with the illustrated embodiments, the rectifier circuit 260 may be as simple as single diode, used to ensure that the energy stored on the capacitor 262 does not back-flow toward the power supply 102 during periods of time when low voltage is present on the active conductor 206. As discussed above, the duty cycle of the pulse train of DC operational power provided from the power supply 102 is controlled by the power supply 102 based on the signal on the sense signal line 210. As illustrated, in some embodiments an output voltage from the power module 250 may be controlled to any voltage in the range of 7.5 to 12 V inclusive.

Figure 4:
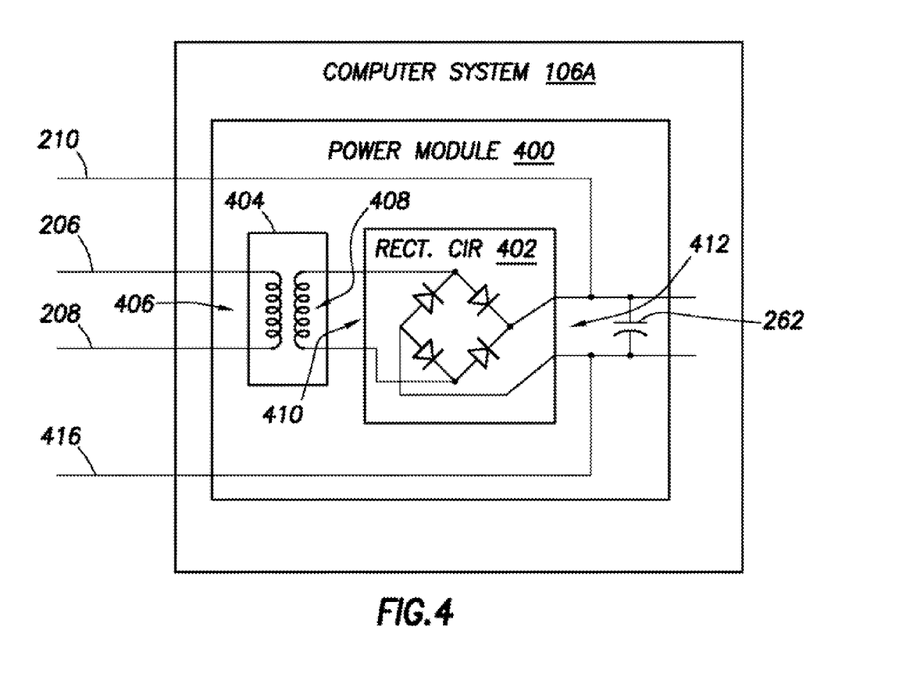
FIG. 4 shows a computer system in accordance with at least some embodiments.

FIG. 4 shows a computer system 106A in accordance with other embodiments. In particular, illustrative computer system 106A comprises a power module 400. The processors, memories and bridge devices are omitted so as not to unduly complicate the figure. The power module 400 receives DC operational power from the power supply, and provides power to the computer system 106A devices. The power module 400 comprises a transformer 404 that comprises a primary side 406 and a secondary side 408. In some embodiments, the transformer 404 has a 1:1 turns ratio, and thus operates as an isolation transformer; however, in other embodiments the transformer 404 may act as a step-up or a step-down transformer in addition to the isolation aspects. The DC operational power in the form of a pulse train having varying duty cycle couples to the primary side 406 of the transformer 404. The secondary side 408 of the transformer 404 couples to the rectifier circuit 402. Rectifier circuit 402 defines an input portion 410 and an output portion 412. The secondary side 408 of the transformer 404 couples to the input portion 410 of the rectifier circuit 402, and the output side 412 of the rectifier circuit 402 couples to a filter circuit 262, again illustrated as capacitor. In accordance with theses embodiments, the rectifier circuit 402 may be a full-wave bridge rectifier circuit. The duty cycle of the pulse train of DC operational power provided from the power supply is controlled by the power supply based on the signal on the sense signal line 210. Because the transformer "floats" the returns as between the power supply and the computer system 106A, a separate sense return line 416 may be used. Though not specifically shown, because of the isolated or "floated" nature of the computer system 106 relative to the power supply 102, the sense and/or return lines may also be electrically isolated, such as by an opto-isolator system.

Figure 5:
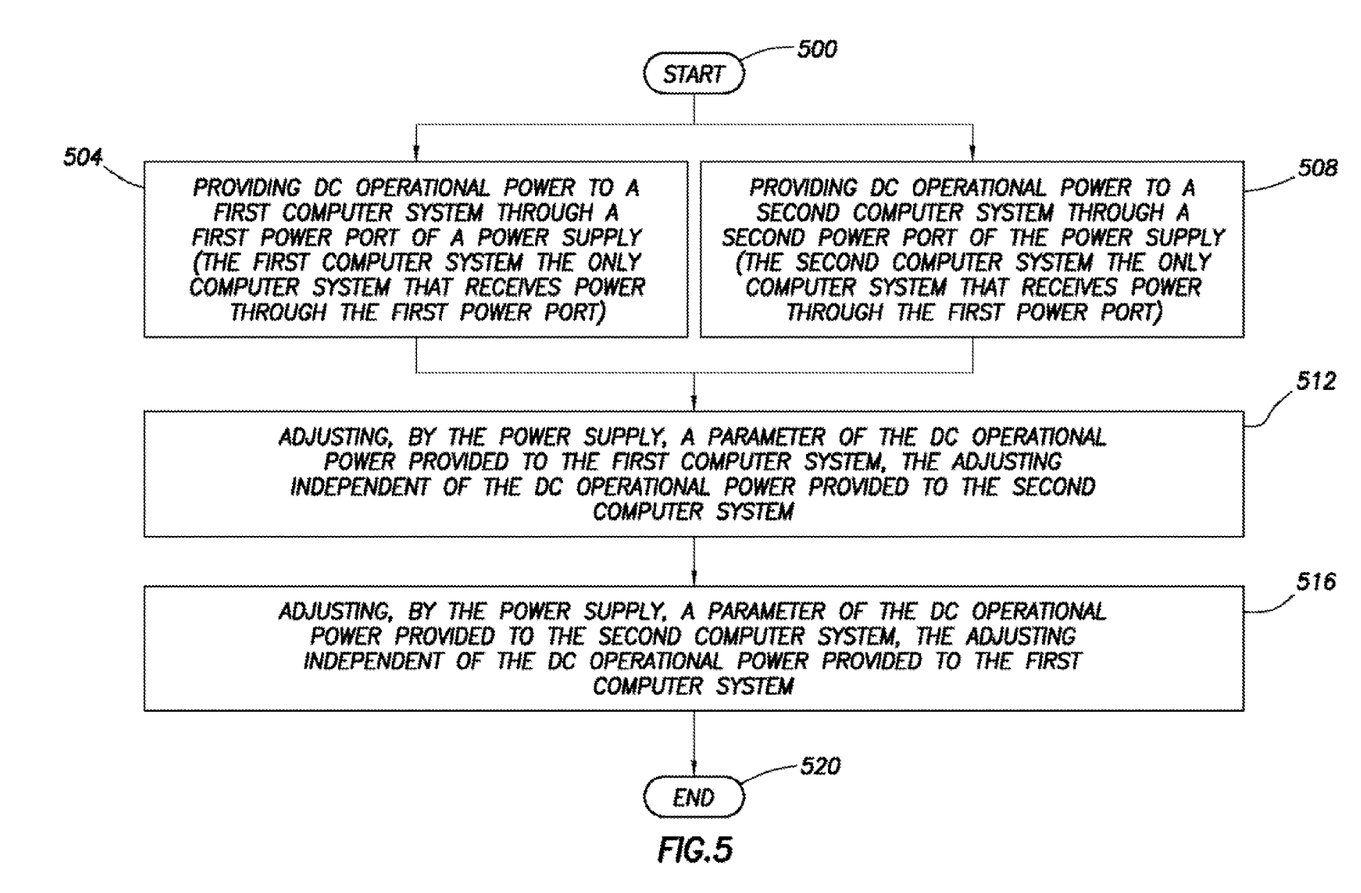
FIG. 5 shows a method in accordance with at least some embodiments.

FIG. 5 illustrates a method in accordance with at least some embodiments. In particular, the method starts (block 500) and proceeds to providing DC operational power to a first computer system through a first power port of a power supply (the first computer system the only computer system that receives power through the first power port) (block 504). Concurrently with providing DC operational power to the first computer system, the method comprises providing DC operational power to a second computer system through a second power port of the power supply (the second computer system the only computer system that receives power through the first power port) (block 508). Providing operational power to two computer systems through two separate power ports is merely illustrative, and providing operational power to more than two computer systems is contemplated. Next, a parameter of the DC operational power provided to the first computer system is adjusted, by the power supply, independent of the operational power provided to the second computer system (block 512), a parameter of the DC operational power provided to the second computer system is adjusted, by the power supply, independent of the DC operational power provided to the first computer system (block 516), and the method ends (block 520). In some embodiments the DC operational power is provided in each case a pulse train, and the parameter modified may by either or both of the voltage of the pulse train or the duty cycle of the pulse train.

Figure 6:
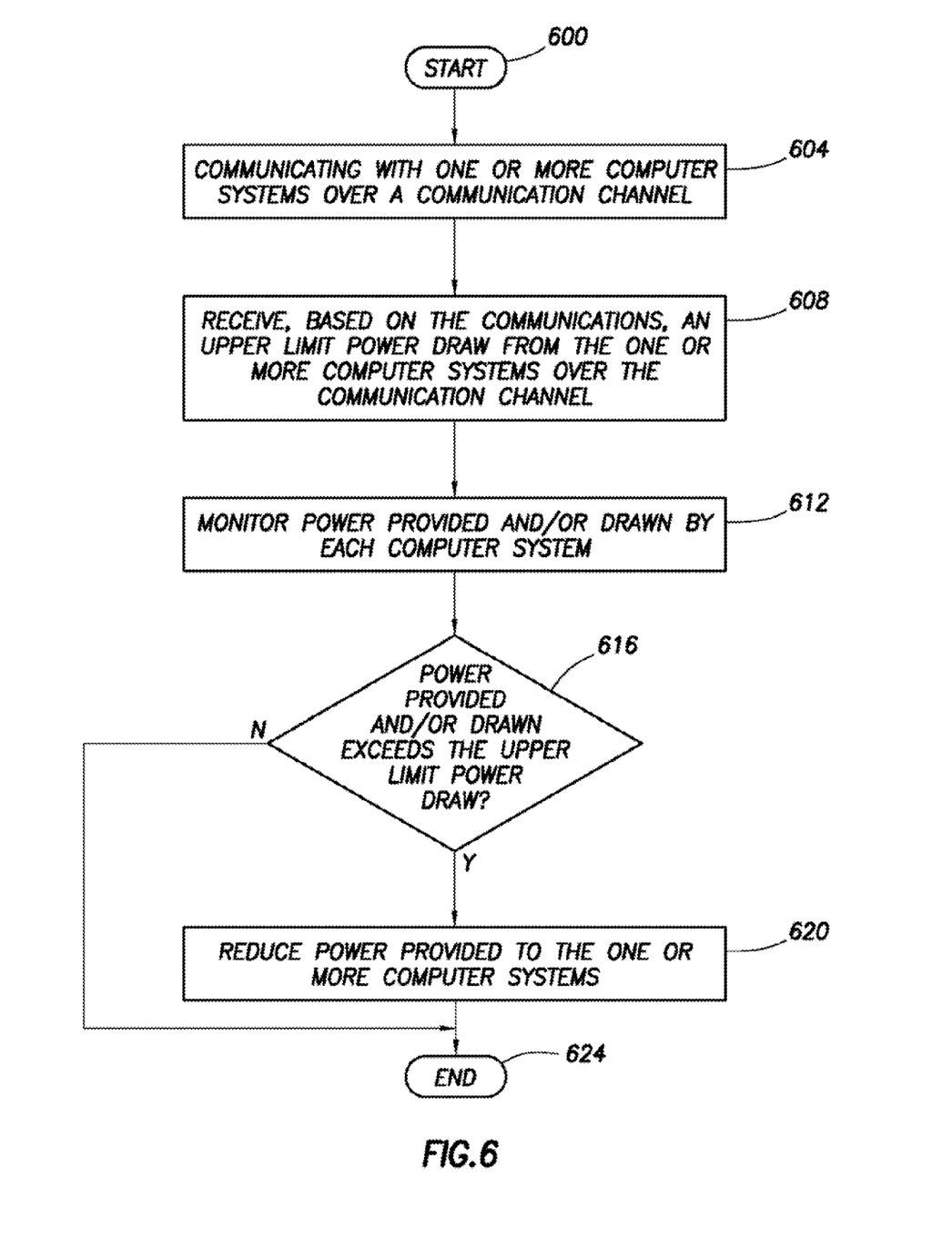
FIG. 6 shows a flow diagram in accordance with at least some embodiments.

FIG. 6 illustrates flow diagram of a program executable by processor 212 in accordance with at least some embodiments. In particular, the method starts (block 600) and proceeds to communicating with one or more computer systems over a communication channel (block 604). Based on the communications, an upper limit power draw is received from the one or more computer systems over the communication channel (block 608). Thereafter, the power provided and/or drawn by each computer system is monitored (block 612), and if the power provided and/or drawn exceeds the upper limit power draw (block 616), then the power provided to the one or more computer systems is reduced (block 620), and the method ends (block 624). In some cases, the power is reduced to upper limit value earlier provided from the computer system, and in other cases the reduction may be a complete reduction. In the event the power draw does not exceed the upper limit power draw (block 616), the method directly ends (block 624), to be immediately repeated in some embodiments.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system comprising:
a power supply configured to convert an alternating current (AC) power signal to a direct current (DC) power signal, and the power supply comprising a first power port and a second power port, the second power port different than the first power port;
a first computer system coupled to the first power port, the power supply configured to provide DC operational power to the first computer system through the first power port as a pulse train with a varying duty cycle, and the first computer system the only computer system receiving operational power through the first power port;
a second computer system different than the first computer system, the second computer system coupled to the second power port, the power supply configured to provide DC operational power to the second computer system through the second power port as a pulse train with a varying duty cycle, and the second computer system the only computer system receiving operational power from the second power port;
a first cable coupling the first computer system to the first power port, wherein the first cable comprises a first sense signal line, and wherein the power supply is configured to adjust the duty cycle based on a signal carried by the first sense signal line; and
a second cable coupling the second computer system to the second power port, wherein the second cable comprises a second sense signal line, and wherein the power supply is configured to adjust the duty cycle based on a signal carried by the second sense signal line.

2. The system of claim 1 wherein the DC operational power provided through each of the first and second power ports has a voltage level greater equal to or greater than 300 volts.

3. The system of claim 1 wherein the power supply is configured to adjust the duty cycle responsive to changes in power demand by the first computer system.

4. The system of claim 1 wherein the frequency of the pulse train is about 100 kilo-Hertz.

5. The system of claim 1 further comprising:
the power supply provides the DC operational power through the first power port as a pulse train with a duty cycle, and wherein the power supply is configured to vary the duty cycle of the pulse train from the first power port responsive to power demand by the first computer system; and
the power supply provides the DC operational power through the second power port as a pulse train with a duty cycle, and wherein the power supply is configured to vary the duty cycle of the pulse train from the second power port responsive to power demand by the second computer system.

6. A power supply comprising:
a power converter configured to convert an alternating current (AC) signal to a direct current (DC) power signal with a voltage of greater than 300 volts;
a first pulse-width modulation circuit coupled to the DC power signal, the first pulse-width modulation circuit configured to provide operational power from the DC power signal to a first computer system, the operational power in the form of a pulse train with a first duty cycle;
a second pulse-width modulation circuit, different than the first pulse-width modulation circuit, the second pulse-width modulation circuit coupled to the DC power signal, the second pulse-width modulation circuit configured to provide operational power from the DC power signal to a second computer system, the operational power in the form of a pulse train with a second duty cycle;
the power supply is configured to vary the first duty cycle circuit based on power drawn by the first computer system;
the power supply is configured to vary the second duty cycle based on power drawn by the second computer system;
a first sense signal line coupled to the first pulse-width modulation circuit, and configured to couple to the first computer system, the first pulse-width modulation circuit configured to vary the first duty cycle based on a signal carried by the first sense signal line; and
a second sense signal line coupled to the second pulse-width modulation circuit, and configured to couple to the second power supply, the second pulse-width modulation circuit configured to vary the second duty cycle based on a signal carried by the second sense signal line.

7. The power supply of claim 6 further comprising:
a processor coupled to the first pulse-width modulation circuit and the second pulse-width modulation circuit, and the processor configured to communicatively couple to the first computer system and the second computer system;
the processor is configured to communicate with each the first and second computer systems, and to command change of the first duty cycle and the second duty cycle based on the communications.

8. The power supply of claim 6 wherein the voltage of the DC power signal is between and including 380 and 480 volts.

9. The power supply of claim 6 wherein the frequency of the pulse train is about 100 kilo-Hertz.

10. A computer system comprising:
a processor;
a memory coupled to the processor;
a power module coupled to the processor, the power module configured to receive direct current (DC) operational power for the computer system from an external source, the DC operational power in the form a pulse train with a varying duty cycle, the duty cycle controlled by a system external to the computer system, the power module comprising:
a rectifier circuit that defines an input portion and an output portion, the input portion coupled to the DC operational power; and
a capacitor coupled to the output portion of the rectifier circuit, wherein voltage at the output portion of the rectifier circuit is changed by the system external to the computer system; and
a sense line coupled to the output portion of the rectifier circuit and the sense line configured to couple to the system external to the computer system, wherein feedback to control the voltage at the output portion of the rectifier circuit by the system external to the computer system is provided by the sense line.

11. The computer system of claim 10 wherein the power module further comprises:
an isolation transformer that defines a primary and a secondary, the primary coupled to the DC operational power;
a full-wave rectifier circuit that defines an input portion and an output portion, the input portion coupled to the secondary of the isolation transformer;
a capacitor coupled to the output portion of the rectifier circuit; wherein
voltage at the output portion of the full-wave rectifier circuit is changed by the system external to the computer system.

* * * * *

UNITED STATES PATENT AND TRADEMARK OFFICE
CERTIFICATE OF CORRECTION

Page 1 of 1

PATENT NO. : 9,116,676 B2
APPLICATION NO. : 13/320947
DATED : August 25, 2015
INVENTOR(S) : Izquierdo et al.

It is certified that error appears in the above-identified patent and that said Letters Patent is hereby corrected as shown below:

On the title page, in the illustrative figure, reference numeral 104, line 3, delete "SOIURCE" and insert -- SOURCE --.

On the title page, in the illustrative figure, line 6 approx., delete "SOIURCE" and insert -- SOURCE --.

In the Drawings

In sheet 1 of 5, Fig. 1, reference numeral 104, line 3, delete "SOIURCE" and insert -- SOURCE --, therefor.

In sheet 1 of 5, Fig. 1, line 6 approx., delete "SOIURCE" and insert -- SOURCE --, therefor.

Signed and Sealed this
Thirty-first Day of May, 2016

Michelle K. Lee
*Director of the United States Patent and Trademark Office*